United States Patent
Voltz

(10) Patent No.: US 11,875,172 B2
(45) Date of Patent: Jan. 16, 2024

(54) BARE METAL COMPUTER FOR BOOTING COPIES OF VM IMAGES ON MULTIPLE COMPUTING DEVICES USING A SMART NIC

(71) Applicant: VMware LLC, Palo Alto, CA (US)

(72) Inventor: Renaud B. Voltz, Los Altos Hills, CA (US)

(73) Assignee: VMware LLC, Palo Alto, CA (US)

( * ) Notice: Subject to any disclaimer, the term of this patent is extended or adjusted under 35 U.S.C. 154(b) by 178 days.

(21) Appl. No.: 17/107,568

(22) Filed: Nov. 30, 2020

(65) Prior Publication Data

US 2022/0100542 A1    Mar. 31, 2022

Related U.S. Application Data

(60) Provisional application No. 63/084,534, filed on Sep. 28, 2020, provisional application No. 63/084,536, filed on Sep. 28, 2020.

(51) Int. Cl.
*G06F 9/455* (2018.01)
*G06F 9/54* (2006.01)
(Continued)

(52) U.S. Cl.
CPC ........ *G06F 9/45558* (2013.01); *G06F 9/4406* (2013.01); *G06F 9/45541* (2013.01);
(Continued)

(58) Field of Classification Search
CPC ............... G06F 9/45558; G06F 9/4406; G06F 9/45541; G06F 9/547; G06F 13/4221;
(Continued)

(56) References Cited

U.S. PATENT DOCUMENTS

| | | |
|---|---|---|
| 5,884,313 A | 3/1999 | Talluri et al. |
| 5,887,134 A | 3/1999 | Ebrahim |

(Continued)

FOREIGN PATENT DOCUMENTS

| | | |
|---|---|---|
| CA | 2672100 A1 | 6/2008 |
| CA | 2918551 A1 | 7/2010 |

(Continued)

OTHER PUBLICATIONS

Doyle, Lee. "An introduction to smart NICs and their benefits". Accessible at https://www.techtarget.com/searchnetworking/tip/An-introduction-to-smart-NICs-and-their-benefits. Available Jul. 2019 (Year: 2019).*

(Continued)

*Primary Examiner* — Michael W Ayers
(74) *Attorney, Agent, or Firm* — Quarles & Brady LLP

(57) ABSTRACT

Some embodiments provide a method for operating a physical server in a network. The method stores multiple copies of a virtual machine (VM) image at a network-accessible storage. The method uses a first copy of the VM image as a virtual disk to execute a VM on a hypervisor of a first physical computing device. The method uses a second copy of the VM image as a virtual disk accessible via a smart network interface controller (NIC) of a second physical computing device to execute an operating system of the second physical computing device.

23 Claims, 12 Drawing Sheets

(51) Int. Cl.
  *G06F 13/42* (2006.01)
  *G06F 9/4401* (2018.01)
  *G06F 9/50* (2006.01)
(52) U.S. Cl.
  CPC .......... *G06F 9/547* (2013.01); *G06F 13/4221* (2013.01); *G06F 9/5077* (2013.01); *G06F 2009/4557* (2013.01); *G06F 2009/45579* (2013.01); *G06F 2009/45591* (2013.01); *G06F 2009/45595* (2013.01); *G06F 2213/0026* (2013.01)
(58) Field of Classification Search
  CPC ... G06F 2009/4557; G06F 2009/45591; G06F 2009/45595; G06F 2213/0026; G06F 9/5077; G06F 2009/45579
  See application file for complete search history.

(56) References Cited

U.S. PATENT DOCUMENTS

| | | | |
|---|---|---|---|
| 5,974,547 | A | 10/1999 | Klimenko |
| 6,219,699 | B1 | 4/2001 | McCloghrie et al. |
| 6,393,483 | B1 | 5/2002 | Latif et al. |
| 6,496,935 | B1 | 12/2002 | Fink et al. |
| 7,079,544 | B2 | 7/2006 | Wakayama et al. |
| 7,424,710 | B1 | 9/2008 | Nelson et al. |
| 7,606,260 | B2 | 10/2009 | Oguchi et al. |
| 7,849,168 | B2 | 12/2010 | Utsunomiya et al. |
| 8,442,059 | B1 | 5/2013 | Iglesia et al. |
| 8,660,129 | B1 | 2/2014 | Brendel et al. |
| 8,825,900 | B1 | 9/2014 | Gross et al. |
| 8,856,518 | B2 | 10/2014 | Sridharan et al. |
| 8,931,047 | B2 | 1/2015 | Wanser et al. |
| 9,008,085 | B2 | 4/2015 | Kamble et al. |
| 9,116,727 | B2 | 8/2015 | Benny et al. |
| 9,135,044 | B2 | 9/2015 | Maharana |
| 9,143,582 | B2 | 9/2015 | Banavalikar et al. |
| 9,152,593 | B2 | 10/2015 | Galles |
| 9,154,327 | B1 | 10/2015 | Marino et al. |
| 9,197,551 | B2 | 11/2015 | DeCusatis et al. |
| 9,231,849 | B2 | 1/2016 | Hyoudou et al. |
| 9,378,161 | B1 | 6/2016 | Dalal et al. |
| 9,419,897 | B2 | 8/2016 | Cherian et al. |
| 9,460,031 | B1 | 10/2016 | Dalal et al. |
| 9,692,698 | B2 | 6/2017 | Cherian et al. |
| 9,697,019 | B1* | 7/2017 | Fitzgerald ............... H04L 41/08 |
| 9,952,782 | B1* | 4/2018 | Chandrasekaran ... G06F 3/0607 |
| 10,050,884 | B1 | 8/2018 | Dhanabalan et al. |
| 10,142,127 | B2 | 11/2018 | Cherian et al. |
| 10,162,793 | B1 | 12/2018 | BShara et al. |
| 10,193,771 | B2 | 1/2019 | Koponen et al. |
| 10,284,478 | B2 | 5/2019 | Yokota |
| 10,534,629 | B1 | 1/2020 | Pierre et al. |
| 10,567,308 | B1 | 2/2020 | Subbiah et al. |
| 10,997,106 | B1 | 5/2021 | Bandaru et al. |
| 11,005,755 | B2 | 5/2021 | Yu et al. |
| 11,108,593 | B2 | 8/2021 | Cherian et al. |
| 11,221,972 | B1 | 1/2022 | Raman et al. |
| 11,385,981 | B1* | 7/2022 | Silakov ............... G06F 13/4221 |
| 2002/0069245 | A1 | 6/2002 | Kim |
| 2003/0130833 | A1 | 7/2003 | Brownell et al. |
| 2003/0140124 | A1 | 7/2003 | Burns |
| 2003/0145114 | A1 | 7/2003 | Gertner |
| 2003/0200290 | A1 | 10/2003 | Zimmerman et al. |
| 2003/0217119 | A1 | 11/2003 | Raman et al. |
| 2005/0053079 | A1 | 3/2005 | Havala |
| 2006/0029056 | A1 | 2/2006 | Perera et al. |
| 2006/0041894 | A1 | 2/2006 | Cheng et al. |
| 2006/0206603 | A1 | 9/2006 | Rajan et al. |
| 2006/0206655 | A1 | 9/2006 | Chappell et al. |
| 2006/0236054 | A1 | 10/2006 | Kitamura |
| 2007/0174850 | A1 | 7/2007 | Zur |
| 2008/0008202 | A1 | 1/2008 | Terrell et al. |
| 2008/0267177 | A1 | 10/2008 | Johnson et al. |
| 2009/0089537 | A1 | 4/2009 | Vick et al. |
| 2009/0119087 | A1 | 5/2009 | Ang et al. |
| 2009/0161547 | A1 | 6/2009 | Riddle et al. |
| 2009/0161673 | A1 | 6/2009 | Breslau et al. |
| 2010/0070677 | A1 | 3/2010 | Thakkar |
| 2010/0115208 | A1 | 5/2010 | Logan |
| 2010/0165874 | A1 | 7/2010 | Brown et al. |
| 2010/0275199 | A1 | 10/2010 | Smith et al. |
| 2010/0287306 | A1 | 11/2010 | Matsuda |
| 2011/0060859 | A1 | 3/2011 | Shukla et al. |
| 2011/0219170 | A1 | 9/2011 | Frost et al. |
| 2012/0042138 | A1 | 2/2012 | Eguchi et al. |
| 2012/0072909 | A1 | 3/2012 | Malik et al. |
| 2012/0079478 | A1 | 3/2012 | Galles et al. |
| 2012/0096459 | A1 | 4/2012 | Miyazaki |
| 2012/0163388 | A1 | 6/2012 | Goel et al. |
| 2012/0167082 | A1 | 6/2012 | Kumar et al. |
| 2012/0259953 | A1 | 10/2012 | Gertner |
| 2012/0278584 | A1 | 11/2012 | Nagami et al. |
| 2012/0320918 | A1 | 12/2012 | Fomin et al. |
| 2013/0033993 | A1 | 2/2013 | Cardona et al. |
| 2013/0058346 | A1 | 3/2013 | Sridharan et al. |
| 2013/0061047 | A1 | 3/2013 | Sridharan et al. |
| 2013/0073702 | A1 | 3/2013 | Umbehocker |
| 2013/0125122 | A1 | 5/2013 | Hansen |
| 2013/0145106 | A1 | 6/2013 | Kan |
| 2013/0311663 | A1 | 11/2013 | Kamath et al. |
| 2013/0318219 | A1 | 11/2013 | Kancherla |
| 2013/0318268 | A1 | 11/2013 | Dalal et al. |
| 2014/0003442 | A1 | 1/2014 | Hernandez et al. |
| 2014/0056151 | A1 | 2/2014 | Petrus et al. |
| 2014/0067763 | A1* | 3/2014 | Jorapurkar .......... G06F 11/1438 707/674 |
| 2014/0074799 | A1* | 3/2014 | Karampuri ............. G06F 16/11 707/689 |
| 2014/0098815 | A1 | 4/2014 | Mishra et al. |
| 2014/0115578 | A1 | 4/2014 | Cooper et al. |
| 2014/0123211 | A1 | 5/2014 | Wanser et al. |
| 2014/0208075 | A1 | 7/2014 | McCormick, Jr. |
| 2014/0215036 | A1 | 7/2014 | Elzur |
| 2014/0244983 | A1 | 8/2014 | McDonald et al. |
| 2014/0245296 | A1 | 8/2014 | Sethuramalingam et al. |
| 2014/0269712 | A1 | 9/2014 | Kidambi |
| 2014/0269754 | A1 | 9/2014 | Eguchi et al. |
| 2015/0007317 | A1 | 1/2015 | Jain |
| 2015/0016300 | A1 | 1/2015 | Devireddy et al. |
| 2015/0019748 | A1 | 1/2015 | Gross, IV et al. |
| 2015/0020067 | A1* | 1/2015 | Brant .................. G06F 9/45558 718/1 |
| 2015/0052280 | A1 | 2/2015 | Lawson |
| 2015/0117445 | A1 | 4/2015 | Koponen et al. |
| 2015/0156250 | A1 | 6/2015 | Varshney et al. |
| 2015/0172183 | A1 | 6/2015 | DeCusatis et al. |
| 2015/0200808 | A1 | 7/2015 | Gourlay et al. |
| 2015/0212892 | A1 | 7/2015 | Li et al. |
| 2015/0215207 | A1 | 7/2015 | Qin et al. |
| 2015/0222547 | A1 | 8/2015 | Hayut et al. |
| 2015/0242134 | A1 | 8/2015 | Takada et al. |
| 2015/0261556 | A1 | 9/2015 | Jain et al. |
| 2015/0261720 | A1 | 9/2015 | Kagan et al. |
| 2015/0347231 | A1 | 12/2015 | Gopal et al. |
| 2015/0358288 | A1 | 12/2015 | Jain et al. |
| 2015/0358290 | A1 | 12/2015 | Jain et al. |
| 2015/0381494 | A1 | 12/2015 | Cherian et al. |
| 2015/0381495 | A1 | 12/2015 | Cherian et al. |
| 2016/0006696 | A1* | 1/2016 | Donley ............... H04L 63/0236 709/223 |
| 2016/0092108 | A1 | 3/2016 | Karaje et al. |
| 2016/0134702 | A1 | 5/2016 | Gertner |
| 2016/0162302 | A1* | 6/2016 | Warszawski ........ G06F 9/45558 713/2 |
| 2016/0162438 | A1 | 6/2016 | Hussain et al. |
| 2016/0179579 | A1 | 6/2016 | Amann et al. |
| 2016/0182342 | A1 | 6/2016 | Singaravelu et al. |
| 2016/0306648 | A1 | 10/2016 | Deguillard et al. |
| 2017/0024334 | A1 | 1/2017 | Bergsten et al. |
| 2017/0075845 | A1 | 3/2017 | Kopparthi |
| 2017/0093623 | A1 | 3/2017 | Zheng |
| 2017/0099532 | A1 | 4/2017 | Kakande |

(56) References Cited

U.S. PATENT DOCUMENTS

| | | |
|---|---|---|
| 2017/0161090 A1 | 6/2017 | Kodama |
| 2017/0161189 A1 | 6/2017 | Gertner |
| 2017/0180477 A1 | 6/2017 | Hashimoto |
| 2017/0214549 A1 | 7/2017 | Yoshino et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0109471 A1 | 4/2018 | Chang et al. |
| 2018/0152540 A1 | 5/2018 | Niell et al. |
| 2018/0203719 A1* | 7/2018 | Zhang ............... G06F 8/52 |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1* | 10/2019 | Shih ............... H04L 49/25 |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1* | 10/2020 | He ............... G06F 3/0604 |
| 2020/0328192 A1 | 10/2020 | Zaman et al. |
| 2020/0382329 A1 | 12/2020 | Yuan |
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0043572 A1* | 2/2022 | Said ............... G06F 11/1464 |
| 2022/0100432 A1 | 3/2022 | Kim et al. |
| 2022/0100491 A1 | 3/2022 | Voltz et al. |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1* | 5/2022 | Cui ............... H04L 63/0236 |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 3598291 A1 | 1/2020 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2010008984 A2 | 1/2010 |
| WO | 2016003489 A1 | 1/2016 |
| WO | 2020027913 A1 | 2/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |

OTHER PUBLICATIONS

Angeles, Sara. "Cloud vs. Data Center: What's the difference?" Accessible at https://www.businessnewsdaily.com/4982-cloud-vs-data-center.html. Available Nov. 23, 2018 (Year: 2018).*

"Middlebox" https://en.wikipedia.org/wiki/Middlebox, accessible on Nov. 8, 2019 (Year: 2019).*

Author Unknown, "vSAN Planning and Deployment" Update 3, Aug. 20, 2019, 85 pages, VMware, Inc., Palo Alto, CA, USA.

Author Unknown, "What is End-to-End Encryption and How does it Work?," Mar. 7, 2018, 4 pages, Proton Technologies AG, Geneva, Switzerland.

Harris, Jim, "Accelerating NVME-oF for VMs with the Storage Performance Development Kit," Flash Memory Summit, Aug. 2017, 18 pages, Intel Corporation, Santa Clara, CA.

Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.

Author Unknown, "An Introduction to SmartNICs" The Next Platform, Mar. 4, 2019, 4 pages, retrieved from https://www.nextplatform.com/2019/03/04/an-introduction-to-smartnics/.

Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.

Author Unknown, "Package Manager," Wikipedia, Sep. 8, 2020, 10 pages.

Author Unknown, "VMDK", Wikipedia, May 17, 2020, 3 pages, retrieved from https://en.wikipedia.org/w/index.php?title=VMDK&oldid=957225521.

Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.

Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.

Liu, Ming, et al., "Offloading Distributed Applications onto SmartNICs using iPipe," SIGCOMM '19, Aug. 19-23, 2019, 16 pages, ACM, Beijing, China.

(56) References Cited

OTHER PUBLICATIONS

PCT International Search Report and Written Opinion of Commonly Owned International Patent Application PCT/US2021/042121, dated Oct. 27, 2021, 13 pages, International Searching Authority (EPO).

Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.

Author Unknown, "8.6 Receive-Side Scaling (RSS)," Month Unknown 2020, 2 pages, Red Hat, Inc.

Herbert, Tom, et al., "Scaling in the Linux Networking Stack," Jun. 2, 2020, retrieved from https://01.org/linuxgraphics/gfx-docs/drm/networking/scaling.html.

Non-Published Commonly Owned U.S. Appl. No. 16/890,890 (F967), filed Jun. 2, 2020, 39 pages, VMware, Inc.

Stringer, Joe, et al., "OVS Hardware Offloads Discussion Panel," Nov. 7, 2016, 37 pages, retrieved from http://openvswitch.org/support/ovscon2016/7/1450-stringer.pdf.

Non-Published Commonly Owned Related International Patent Application PCT/US2021/042121 with similar specification, filed Jul. 17, 2021, 39 pages, VMware, Inc.

Non-Published Commonly Owned U.S. Appl. No. 17/461,908 (N131.01.C3), filed Aug. 30, 2021, 60 pages, Nicira, Inc.

Anwer, Muhammad Bilal, et al., "Building A Fast, Virtualized Data Plane with Programmable Hardware," Aug. 17, 2009, 8 pages, VISA'09, ACM, Barcelona, Spain.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

Non-Published Commonly Owned U.S. Appl. No. 17/091,663 (G806), filed Nov. 6, 2020, 29 pages, VMware, Inc.

Non-Published Commonly Owned Related U.S. Appl. No. 17/107,561 with similar specification, filed Nov. 30, 2020, 39 pages, VMware, Inc.

Non-Published Commonly Owned U.S. Appl. No. 17/114,975, filed Dec. 8, 2020, 52 pages, VMware, Inc.

Non-Published Commonly Owned U.S. Appl. No. 17/114,994, filed Dec. 8, 2020, 51 pages, VMware, Inc.

Non-Published Commonly Owned U.S. Appl. No. 17/145,318, filed Jan. 9, 2021, 70 pages, VMware, Inc.

Non-Published Commonly Owned U.S. Appl. No. 17/145,319, filed Jan. 9, 2021, 70 pages, VMware, Inc.

Non-Published Commonly Owned U.S. Appl. No. 17/145,320, filed Jan. 9, 2021, 70 pages, VMware, Inc.

Non-Published Commonly Owned U.S. Appl. No. 17/145,321, filed Jan. 9, 2021, 49 pages, VMware, Inc.

Non-Published Commonly Owned U.S. Appl. No. 17/145,322, filed Jan. 9, 2021, 49 pages, VMware, Inc.

Non-Published Commonly Owned U.S. Appl. No. 17/145,329, filed Jan. 9, 2021, 50 pages, VMware, Inc.

Non-Published Commonly Owned U.S. Appl. No. 17/145,334, filed Jan. 9, 2021, 49 pages, VMware, Inc.

Peterson, Larry L., et al., "OS Support for General-Purpose Routers," Month Unknown 1999, 6 pages, Department of Computer Science, Princeton University.

Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.

Spalink, Tammo, et al., "Building a Robust Software-Based Router Using Network Processors," Month Unknown 2001, 14 pages, ACM, Banff, Canada.

Turner, Jon, et al., "Supercharging PlanetLab—High Performance, Multi-Application Overlay Network Platform," SIGCOMM-07, Aug. 27-31, 2007, 12 pages, ACM, Koyoto, Japan.

\* cited by examiner

BARE METAL COMPUTER FOR BOOTING COPIES OF VM IMAGES ON MULTIPLE COMPUTING DEVICES USING A SMART NIC

BACKGROUND

A datacenter or set of datacenters may include both host computers that host virtual machines (VMs) as well as physical "bare metal" servers. The bare metal servers are provisioned using different files (e.g., an optical disc (ISO) image, a dd image, or a similar format) than the VMs, which use VM-specific format (e.g., virtual machine disk image (VMDK)). As such, two separate disk image files in two different formats are required to deploy the same image on two different computers. Similarly, the interface (e.g., the APIs) used by a compute manager (e.g., VMware's vCenter) to communicate with VMs are not applicable to bare metal computers. As such, techniques that unify the management of the devices within a datacenter or set of datacenters would be useful.

BRIEF SUMMARY

Some embodiments provide methods for using a smart network interface controller (NIC) to manage a bare metal computer in a physical network (e.g., a datacenter or set of datacenters) in a manner similar to the management of virtual machines (VMs) in the same network. Specifically, some embodiments use the smart NIC (i) to enable the bare metal computer to access a VM image and execute the operating system and applications defined by the VM image and/or (ii) to enable a compute manager for the network to communicate with the bare metal computer using the same application programming interfaces (APIs) as for communication with VMs on host computers in the network.

The smart NIC, in some embodiments, is a NIC that includes (i) an application specific integrated circuit (ASIC), (ii) a general-purpose central processing unit (CPU), and (iii) memory. The ASIC, in some embodiments, is an I/O ASIC that handles the processing of packets forwarded to and from the computer, and is at least partly controlled by the CPU. The CPU executes a NIC operating system in some embodiments that controls the ASIC and can run other programs, such as API translation logic to enable the compute manager to communicate with the bare metal computer and to enable the bare metal computer to access the VM image. The smart NIC also includes a configurable peripheral control interface express (PCIe) interface in order to connect to the other physical components of the bare metal computer system (e.g., the x86 CPU, memory, etc.). Via this configurable PCIe interface, the smart NIC can present itself to the bare metal computer system as a multitude of devices, including a packet processing NIC, a hard disk (using non-volatile memory express (NVMe) over PCIe), or other devices.

Although not necessary for managing a bare metal computer, the NIC operating system of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

The smart NIC of some embodiments, as mentioned, enables the bare metal computer system to use a virtual machine image rather than an internal hard disk (or similar local non-volatile memory). The smart NIC connects (via the PCIe bus) to the other components of the bare metal computer system (e.g., the x86 processor(s), the memory) and appears to these components as a local NVMe disk. As such, the bare metal computer sends read/write instructions to the smart NIC (to boot the system, run applications, read and write files, etc.), and the smart NIC streams the required data to and from the VM image at the external storage using NVMe over Fabric (NVMeOF) or a remote distributed storage area network (DSAN) cluster protocol. So long as the external storage is NVMeOF-capable, this external storage may be any type of network-accessible storage (e.g., a distributed storage such as virtual storage area network (VSAN), a storage array, a storage associated with a compute manager, etc.). The read/write commands, in some embodiments, are disk read/write instructions from the CPU, which the smart NIC translates into file read/write commands and sends over NVMeOF.

The VM disk image, in some embodiments, is stored in a proprietary VM-specific format, such as VM disk image (VMDK). The use of such a VM image enables a network administrator to save an image of a configured VM and then use that image to instantiate numerous VMs and/or physical servers. That is, the same VM image that is used to instantiate VMs in the network may also be used for the configuration (e.g., operating system, applications, etc.) of a bare metal physical computer. Thus, the same configuration can be applied by a user of the network to both types of machines (virtual and physical machines).

The smart NIC also enables unified management of the VMs and bare metal computers in the network by enabling a compute manager that manages the machines in the network to use a same set of APIs for configuration and control of the VMs and bare metal computers. Typically, different APIs are used to communicate with VMs than are used to communicate with the bare metal hardware for operations such as powering on/off and configuring the machines and for providing remote console input (e.g., keyboard/mouse/touch input).

The use of a smart NIC, at least at the bare metal computers, allows for the compute manager to use a uniform set of APIs, with the smart NIC translating API requests in a first format from the compute manager into API requests in a second format native to the bare metal computer. For instance, physical computers typically use intelligent platform management interface (IPMI) or Redfish for remote configuration, retrieval of physical resource statistics, etc., whereas for VMs other protocols are used (e.g., platform-specific protocols). The smart NIC operating system of some embodiments includes translation logic that translates the API calls and responses between a unified format used by the compute manager and the native format of the bare metal computer system. In some embodiments, either a hypervisor executing on a host computer or a smart NIC of the host computer also translates API calls and responses between the unified format used by the compute manager and the format used by the VMs.

Through these techniques enabled by the smart NIC of some embodiments, the compute manager of some embodiments (e.g., VMware's vCenter) can manage a network with both hosted VMs and bare metal physical computers while treating each of these types of machines in the same manner. That is, the UI tools, management stacks, etc. for managing VMs can be applied equally to both VMs and bare metal physical computers. These tools include tools for managing and deploying VM images that can now be applied to deploying these images on bare metal physical computers, as well as tools for configuring, viewing, and accessing machines in the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods for using a smart network interface controller (NIC) to manage a bare metal computer in a physical network (e.g., a datacenter or set of datacenters) in a manner similar to the management of virtual machines (VMs) in the same network. Specifically, some embodiments use the smart NIC (i) to enable the bare metal computer to access a VM image and execute the operating system and applications defined by the VM image and/or (ii) to enable a compute manager for the network to communicate with the bare metal computer using the same application programming interfaces (APIs) as for communication with VMs on host computers in the network.

Figure 1:
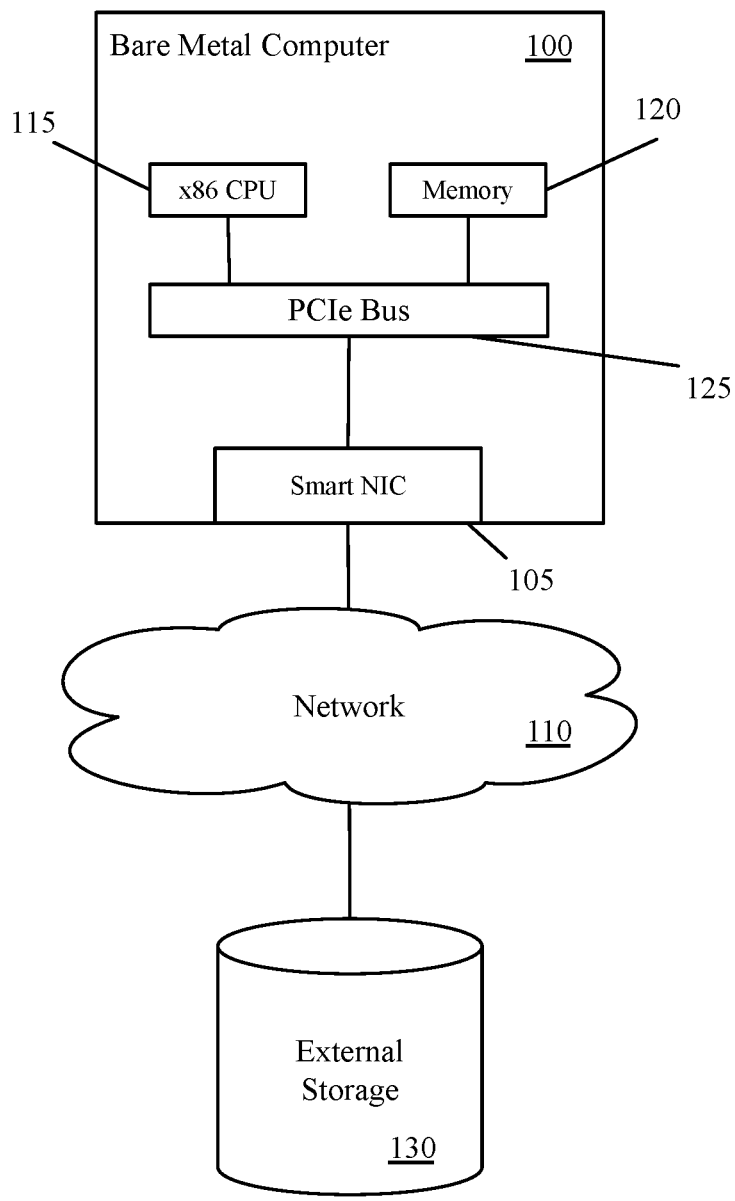
FIG. 1 conceptually illustrates a bare metal computer with a smart NIC according to some embodiments.

FIG. 1 conceptually illustrates a bare metal computer 100 with a smart NIC 105 according to some embodiments. The bare metal computer 100 is a physical server in a network 110. This network 110 may be a datacenter network or represent a network implemented across a set of datacenters in different embodiments. As shown, the bare metal computer 100 includes an x86 general-purpose central processing unit (CPU) 115, a memory 120, and a peripheral control interface express (PCIe) bus 125, in addition to the smart NIC 105. The x86 CPU 115 represents one or more physical CPU cores; many physical devices have multiple cores. Similarly, the memory 120 represents the collective volatile memory of the bare metal computer 100.

In addition, while both the CPU 115 and the memory 120 are shown as directly connected to the PCIe bus 125, it should be understood that many different physical configurations are possible for this hardware, and not all (or necessarily any) of the CPU cores and/or memory will necessarily be directly connected to the PCIe bus 125. Rather, the smart NIC 105 connects to the PCIe bus 125 through a physical PCIe interface and can communicate with the CPU 115 via the PCIe bus 125, even if this communication uses other buses. Similarly, the memory 120 could be connected directly to the CPU cores in some embodiments. It should also be noted that the bare metal computer system 100 will typically include many other hardware elements not shown in this figure, such as one or more GPUs, non-volatile storage (which might not be used to store the operating system and application software, in some embodiments).

The smart NIC 105 connects the bare metal computer 100 to the physical network 110. Though not shown, many other bare metal computers and/or host computers (on which data compute nodes (DCNs), such as VMs, containers, etc. are hosted) may also be connected to the network. In addition, an external storage 130 is accessible to the smart NIC 105 (and thus the bare metal computer 100) via the network 110. This external storage 130 represents any of a number of different types of storages, such as a hyperconverged infrastructure storage (e.g., a virtual storage area network (VSAN)), a logical storage volume (e.g., a virtualized storage area network or network attached storage array), a storage associated with a compute manager, or any other network-accessible storage.

Distributed storage (e.g., VSAN) is a storage virtualization software that uses a software-defined approach to create shared storage for VMs or, using smart NICs, bare metal computers. This distributed storage technology of some embodiments virtualizes physical storage resources (e.g., of host computers) and turns these storage resources into pools (clusters) of storage that can be divided and assigned to VMs, bare metal computing devices, and applications according to their respective requirements. In some embodiments, the distributed storage manages data in the form of flexible data containers (objects), which are logical volumes that have data and metadata distributed across a cluster. Thus, a virtual machine disk image file would be an object in such a storage architecture. The features of such a distributed storage service in some embodiments include (1) data efficiency processes, such as deduplication operations, compression operations, and thin provisioning, (2) security processes, such as end-to-end encryption, and access control operations, (3) data and life cycle management, such as storage vMotion, snapshot operations, snapshot schedules, cloning, disaster recovery, backup, long term storage, (4) performance optimizing operations, such as QoS policies (e.g., max and/or min I/O regulating policies), and (5) analytic operations, such as collecting performance metrics and usage data for virtual disk (IO, latency, etc.). Such hyperconverged infrastructure storage is described in detail in U.S. Pat. No. 9,666,523, while logical storage volumes are described in U.S. Pat. No. 8,775,773. Both of these U.S. Patents are incorporated herein by reference.

Figure 2:
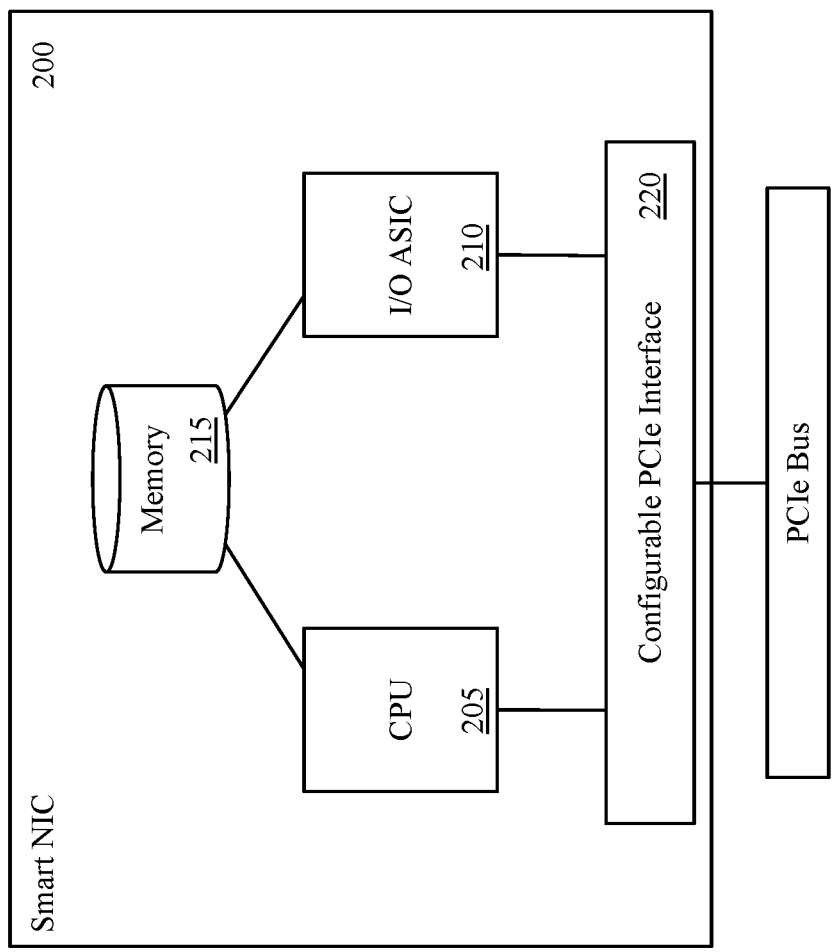
FIG. 2 conceptually illustrates the hardware of a smart NIC of some embodiments.

FIG. 2 conceptually illustrates the hardware of a smart NIC 200 of some embodiments. As shown, the smart NIC 200 includes its own general-purpose (x86) CPU 205, an application-specific integrated circuit (ASIC) 210, memory 215, and a configurable PCIe interface 220. The ASIC 210, in some embodiments, is an I/O ASIC that handles the processing of packets forwarded to and from the computer, and is at least partly controlled by the CPU 205. The configurable PCIe interface 220 enables connection of the smart NIC 200 to the other physical components of the bare metal computer system (e.g., the x86 CPU, memory, etc.) via the PCIe bus of the computer system. Via this configurable PCIe interface, the smart NIC 200 can present itself to the bare metal computer system as a multitude of devices, including a data message processing NIC, a hard disk (using non-volatile memory express (NVMe) over PCIe), or other types of devices.

Figure 3:
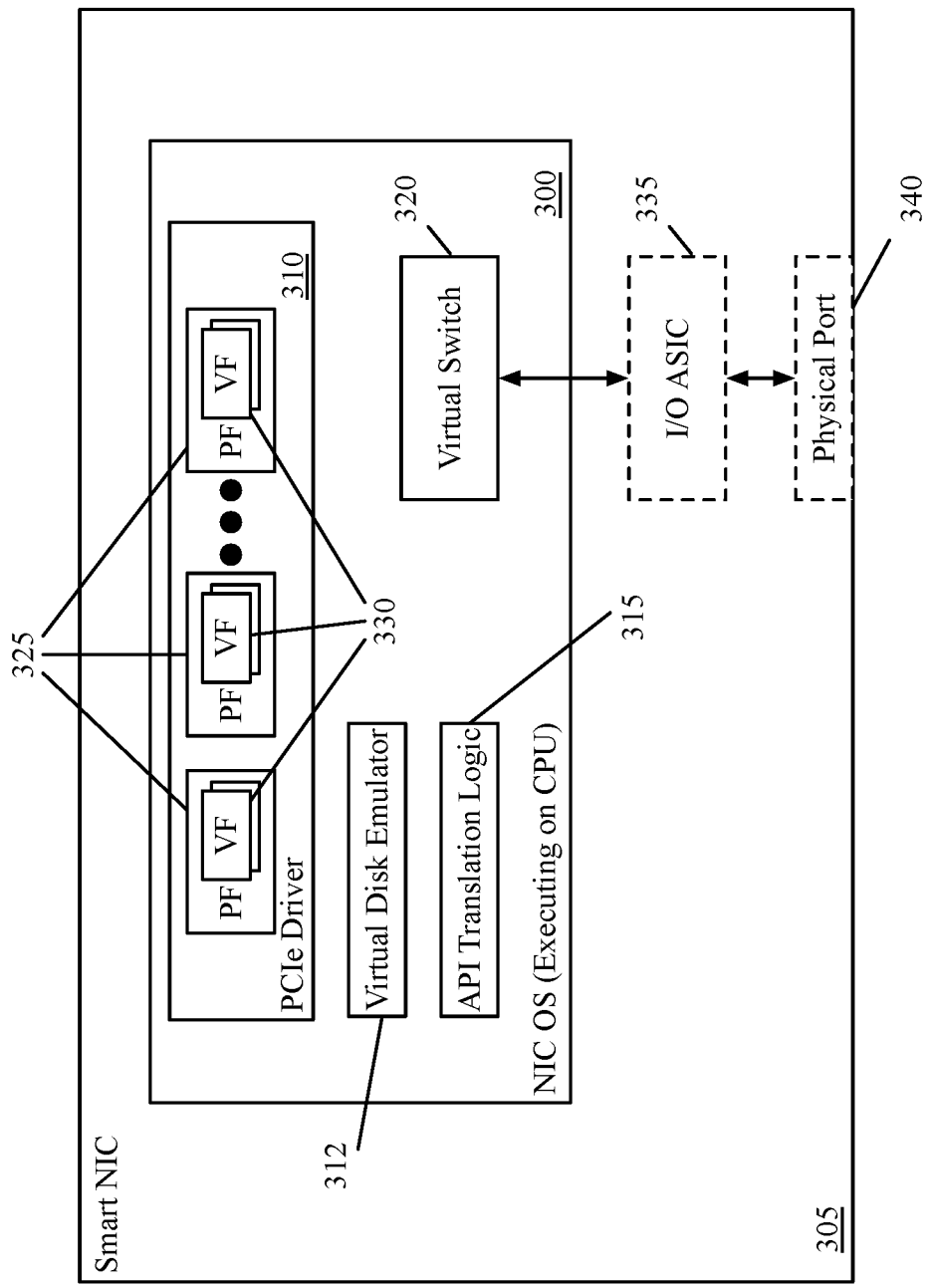
FIG. 3 conceptually illustrates the NIC OS of a smart NIC of some embodiments.

The CPU 205 executes a NIC operating system (OS) in some embodiments that controls the ASIC and can perform other operations, such as translation logic to enable the compute manager to communicate with the bare metal computer and to enable the bare metal computer to access a VM image (e.g., stored in external storage). FIG. 3 conceptually illustrates the NIC OS 300 of a smart NIC 305 of some embodiments. The NIC OS 300 is executed, in some embodiments, by the CPU of the smart NIC (e.g., CPU 205). This NIC OS 300 includes a PCIe driver 310, virtual disk emulator 312, API translation logic 315, and a virtual switch 320, among other components.

The PCIe driver 310 includes multiple physical functions 325, each of which is capable of instantiating multiple virtual functions 330. These different physical functions 325 enable the smart NIC to present as multiple different types of devices to the bare metal computer system via its PCIe bus. For instance, the smart NIC can present itself as a network adapter (for processing data messages to and from the computer system) as well as a non-volatile memory express (NVMe) disk. By presenting itself as an NVMe disk, the smart NIC 305 enables the bare metal computer system to use a VM image rather than an internal hard disk (or similar local non-volatile memory) to boot from and as its primary disk.

The NIC OS 300 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor, although the compute virtualization is not strictly necessary for a bare metal computer. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 300 of some embodiments executes the virtual switch 320. The virtual switch 320 enables the smart NIC to perform software-defined networking, and provide the I/O ASIC 335 of the smart NIC 305 with a set of flow entries so that the I/O ASIC 335 can perform flow processing offload (FPO) for the computer system. This FPO is described in more detail in U.S. Provisional Patent Application 63/084,436, which is incorporated herein by reference. The I/O ASIC 335, in some embodiments, receives data messages from the network and transmits data messages to the network via a physical network port 340.

In addition to acting as a NIC for processing data traffic, the smart NIC presents itself as an NVMe device to the bare metal computer system, as indicated. As such, the bare metal computer (e.g., the CPU of the bare metal computer) sends read/write instructions to the smart NIC (to boot the system, run applications, read and write files, etc.). The smart NIC OS 300 includes a virtual disk emulator 312 in some embodiments that handles these requests from the bare metal computer system and translates them for communication with the external storage. The virtual disk emulator 312 in some embodiments interprets NVMe requests received via the PCIe interface. In some embodiments, the NIC OS 300 includes additional layers depending on the type of storage used for the virtual disk (e.g., whether the storage is a distributed storage area network (DSAN) such as VSAN, a logical storage volume such as vVOL, the compute manager storage, etc.). In some embodiments, the NIC OS 300 streams the required data to and from the external storage (i.e., to and from a VM image at the external storage) using NVMe over Fabric (NVMeOF), so long as the external storage is NVMeOF-capable.

The smart NIC 305 also includes API translation logic 315 in some embodiments. In some embodiments, the smart NIC 305 enables a compute manager to use a uniform set of APIs to communicate with both VMs and the bare metal computer in the network. The compute manager, in some embodiments, is a system responsible for managing the DCNs (e.g., VMs, containers, bare metal servers, etc.) attached to the network. The compute manager manages the life cycle of these DCNs, enables users to control the DCNs, etc. The API translation logic 315 translates API requests in a first format from the compute manager into API requests in a second format native to the bare metal computer. For instance, physical computers typically use intelligent platform management interface (IPMI) or Redfish for remote configuration, retrieval of physical resource statistics, etc., whereas for VMs other protocols are used (e.g., platform-specific protocols). The translation logic 315 translates the API calls and responses between a unified format used by the compute manager and the native format of the bare metal computer system. In some embodiments, either hypervisors executing on host computers or smart NICs of those host computer also translates API calls and responses between the unified format used by the compute manager and the format used by the VMs.

By presenting itself as an attached non-volatile storage device (e.g., an NVMe device), the smart NIC of some embodiments enables the bare metal computer system to use a virtual machine disk image rather than an internal hard disk (or similar local non-volatile memory) as its primary disk (i.e., the disk from which the computer system boots its own OS, and which is the primary file storage for the computer system). As described, the smart NIC connects (via the PCIe bus) to the other components of the bare metal computer system (e.g., the x86 processor(s), the memory) and appears to these components as a local NVMe disk. As such, the bare metal computer sends read/write instructions to the smart NIC (to boot the system, run applications, read and write files, etc.), and the smart NIC of some embodiments streams the required data to and from the VM image at the external storage using NVMeOF. The read/write commands, in some embodiments, are disk read/write instructions from the CPU, which the smart NIC translates into file read/write commands and sends over NVMeOF. Specifically, in some embodiments, the smart NIC receives read/write instructions in the NVMe format, and translates these into NVMeOF using an NVMeOF driver or into a remote DSAN format using a remote DSAN driver.

Figure 4:
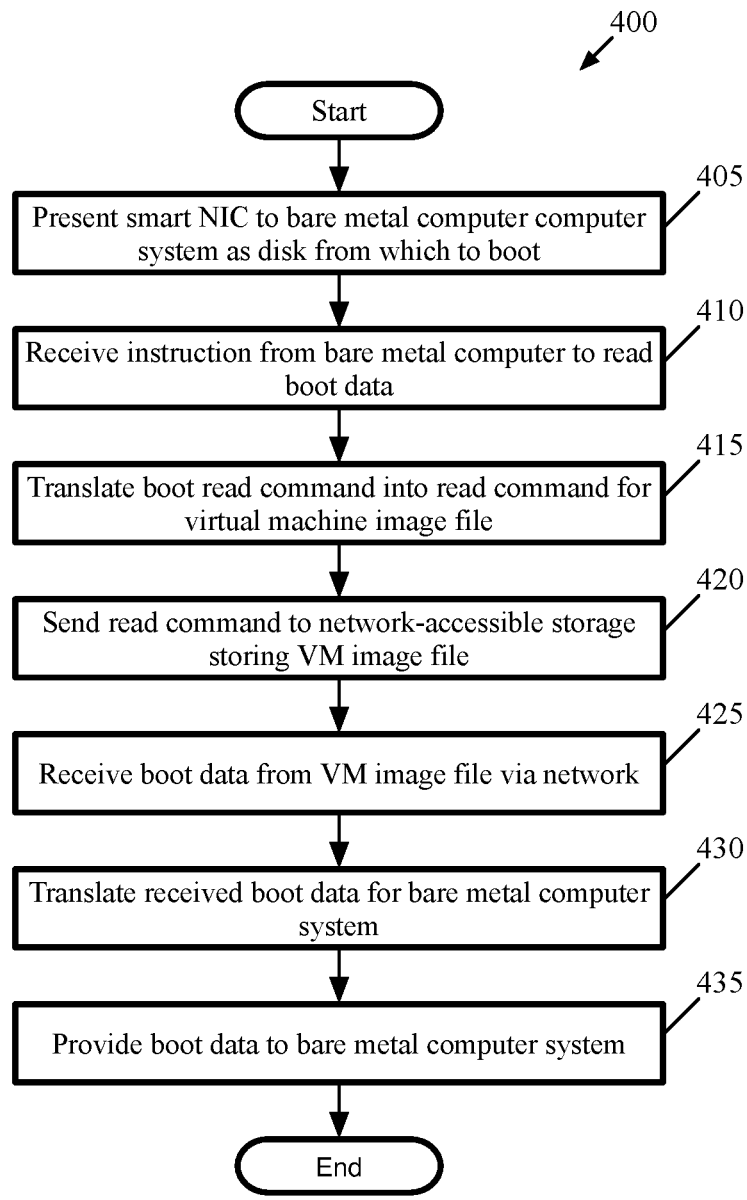
FIG. 4 conceptually illustrates a process of some embodiments for enabling a bare metal computer system to boot from a virtual machine image.

FIG. 4 conceptually illustrates a process 400 of some embodiments for enabling a bare metal computer system to boot from a virtual machine image. The process 400 is performed by a smart NIC of some embodiments (e.g., the virtual disk emulation layer or layers in the NIC OS executing on the smart NIC) that is part of the bare metal computer system, when the bare metal computer system boots up.

As shown, the process 400 begins by presenting (at 405) the smart NIC to the bare metal computer system as a disk from which to boot. In some embodiments, the smart NIC appears as a local NVMe disk when the computer system is powered on and the PCIe bus is initialized by the computer system firmware, and the firmware (e.g., BIOS) of the computer system is configured to use this (apparent) NVMe disk to boot from (i.e., rather than a local hard disk or other local non-volatile storage).

The process 400 then receives (at 410) instructions from the bare metal computer to read boot data. In some embodiments, this initial instruction comes from the BIOS and is for reading a boot loader into memory. In other embodiments, the boot loader is stored in non-volatile memory of the bare metal computer system, and the first instruction received by the smart NIC is from the boot loader, in order to start booting the operating system for the bare metal computer system.

The process 400 translates (at 415) the boot read command into a read command for a VM image file. In some embodiments, the VM image file is stored in a network-accessible storage (e.g., a distributed storage, a storage of the compute manager, etc.) in a proprietary VM-specific format, such as VM disk image (VMDK). The use of such a VM image enables a network administrator to save an image of a configured VM and then use that image to instantiate numerous VMs and/or physical servers. That is, the same VM image that is used to instantiate VMs in the network may also be used for the configuration (e.g., operating system, applications, etc.) of a bare metal physical computer. Thus, the same configuration can be applied by a user of the network to both types of machines (virtual and physical machines). The translation is performed by the virtual disk emulation layer of the smart NIC OS in some embodiments. In some embodiments, this VM image file is stored in a proprietary.

The process 400 then sends (at 420) the read command to the network-accessible storage that stores the VM image file. As described above, the network-accessible storage can be the compute manager storage (i.e., a set of files, including one or more VM images, stored by the compute manager), a distributed storage such as VSAN, etc. Some embodiments require that the network-accessible storage be NVMeOF compatible, so that the smart NIC can use the NVMeOF protocol to read data from and write data to the stored VM image. If VSAN or a similar distributed storage is used, in some embodiments a software layer for coordinating with such a distributed storage is part of the logic used by the smart NIC to translate the boot read commands. This software layer for connecting with a distributed storage such as VSAN may be part of the NIC OS kernel or a user space program, in different embodiments.

It should be noted that, in some embodiments, rather than the smart NIC translating the boot read command into a file read command for the VM image file, the network-accessible storage that stores the VM image file performs this translation. That is, in such embodiments, the smart NIC sends the boot read command to the network-accessible storage, which translates this into a file read command and sends the boot data to the smart NIC.

Next, the process receives (at 425) the boot data from the VM image file via the network. As indicated, this data is received via NVMeOF in some embodiments, and may be the boot loader (if the boot loader is not stored locally) or the initial OS boot data. In some embodiments, the operating system data is streamed from the network-accessible storage so that the data can be loaded into memory of the bare metal computer system.

The process translates (at 430) the received data for the bare metal computer system. This translation is performed by the same layer(s) as operation 415; if there are multiple software layers involved, then these layers perform their operations in the opposite order this time. The translation operations enable the data to appear as though it is being received by the computer system hardware from a local disk read operation.

Finally, the process 400 provides (at 435) the boot data to the bare metal computer system hardware. In some embodiments, the data is provided via the PCIe bus of the computer system, using NVMe over PCIe. The process 400 then ends. It should be understood, as mentioned, that this process may be ongoing as the operating system and any other required boot data is streamed from the externally-stored VM image to the computer system to be loaded into memory in some embodiments.

Figure 5:
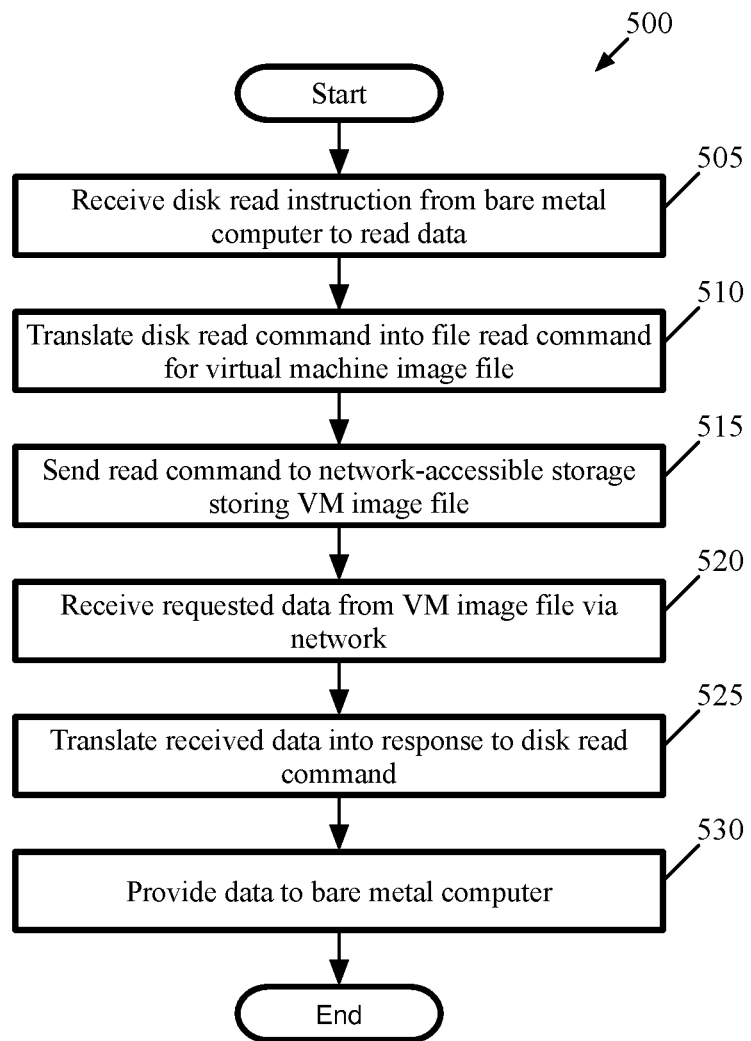
FIG. 5 conceptually illustrates a process of some embodiments for enabling a bare metal computer system to read data from a virtual machine image file.

FIG. 5 conceptually illustrates a process 500 of some embodiments for enabling a bare metal computer system to read data from a virtual machine image file. The process 500 is performed by a smart NIC of some embodiments (e.g., the virtual disk emulation layer or layers in the NIC OS executing on the smart NIC) that is part of the bare metal computer system. These operations are performed any time the computer system needs to read data that is part of the VM image (e.g., to run an application on top of the operating system, open a file, access a database that is part of the VM image, etc.).

As shown, the process 500 begins by receiving (at 505) instructions from the bare metal computer to read data. In some embodiments, this instruction comes from the CPU as a disk read instruction for a particular disk address. The disk read instruction is received via the PCIe bus as an NVMe over PCIe read instruction in some embodiments.

The process 500 translates (at 510) the disk read command into a file read command for the VM image file. As described, in some embodiments the VM image file is stored in a network-accessible storage (e.g., a distributed storage, a storage of the compute manager, etc.) in a proprietary VM-specific format, such as VMDK. Because the VM image file is a virtual disk rather than a physical disk, the translation operation translates the read location into specified data from the VM image file in some embodiments. The translation operation is performed by the virtual disk emulation layer of the smart NIC OS in some embodiments.

The process 500 then sends (at 515) the read command to the network-accessible storage that stores the VM image file. As described above, the network-accessible storage can be the compute manager storage (i.e., a set of files, including one or more VM images, stored by the compute manager), a distributed storage such as VSAN, etc. Some embodiments require that the network-accessible storage be NVMeOF compatible, so that the smart NIC can use the NVMeOF protocol to read data from the stored VM image. If VSAN or a similar distributed storage is used, in some embodiments a software layer for coordinating with such a distributed storage is part of the logic used by the smart NIC to translate the disk read commands.

It should be noted that, in some embodiments, rather than the smart NIC translating the disk read command into a file read command for the VM image file, the network-accessible storage that stores the VM image file performs this translation. That is, in such embodiments, the smart NIC sends the disk read command to the network-accessible storage, which translates this into a file read command and sends the requested data to the smart NIC.

Next, the process 500 receives (at 520) the requested data from the VM image file via the network. As indicated, this data is received via NVMeOF in some embodiments. In some embodiments, depending on the size of the requested data, the data is streamed from the network-accessible storage so that the data can be loaded into memory of the bare metal computer system.

The process 500 translates (at 525) the received data for the bare metal computer system. This translation is performed by the same layer(s) as operation 510 in some embodiments; if there are multiple software layers involved, then these layers perform their operations in the opposite order this time. The translation operations enable the data to appear as though it is being received by the computer system hardware from a local disk read operation. Finally, the process 500 provides (at 530) the requested data to the bare metal computer system hardware. In some embodiments, the data is provided via the PCIe bus of the computer system, using NVMe over PCIe. The process 500 then ends.

Figure 6:
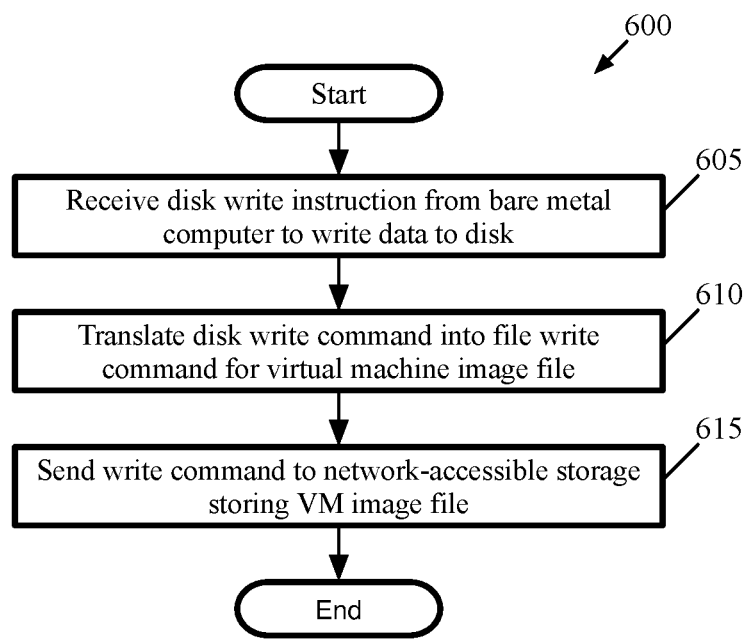
FIG. 6 conceptually illustrates a process of some embodiments for enabling a bare metal computer system to write data to a virtual machine image file.

FIG. 6 conceptually illustrates a process 600 of some embodiments for enabling a bare metal computer system to write data to a virtual machine image file. The process 600 is performed by a smart NIC of some embodiments (e.g., the virtual disk emulation layer or layers in the NIC OS executing on the smart NIC) that is part of the bare metal computer system. These operations are performed any time the computer system needs to write data to the VM image (e.g., to save data to a particular file, save a new file, etc.).

As shown, the process 600 begins by receiving (at 605) instructions from the bare metal computer to write data. In some embodiments, this instruction comes from the CPU as a disk write instruction for a particular disk address. The disk write instruction is received via the PCIe bus as an NVMe over PCIe write instruction in some embodiments.

The process 600 translates (at 610) the disk write command into a file write command for the VM image file. As described, in some embodiments the VM image file is stored in a network-accessible storage (e.g., a distributed storage, a storage of the compute manager, etc.) in a proprietary VM-specific format, such as VMDK. Because the VM image file is a virtual disk rather than a physical disk, the translation operation translates the write location into specified data for the VM image file in some embodiments. The translation operation is performed by the virtual disk emulation layer of the smart NIC OS in some embodiments.

The process 600 then sends (at 615) the write command to the network-accessible storage that stores the VM image file. As described above, the network-accessible storage can be the compute manager storage (i.e., a set of files, including one or more VM images, stored by the compute manager), a distributed storage such as VSAN, etc. Some embodiments require that the network-accessible storage be NVMeOF compatible, so that the smart NIC can use the NVMeOF protocol to write data to the stored VM image. If VSAN or a similar distributed storage is used, in some embodiments a software layer for coordinating with such a distributed storage is part of the logic used by the smart NIC to translate the disk write commands. The process 600 then ends, although in some embodiments an acknowledgment message is received from the external storage to indicate that the data has been written to the VM image file.

It should be noted that, in some embodiments, rather than the smart NIC translating the disk write command into a file write command for the VM image file, the network-accessible storage that stores the VM image file performs this translation. That is, in such embodiments, the smart NIC sends the disk write command to the network-accessible storage, which translates this into a file write command and writes the data to the VM image file.

Figure 7:
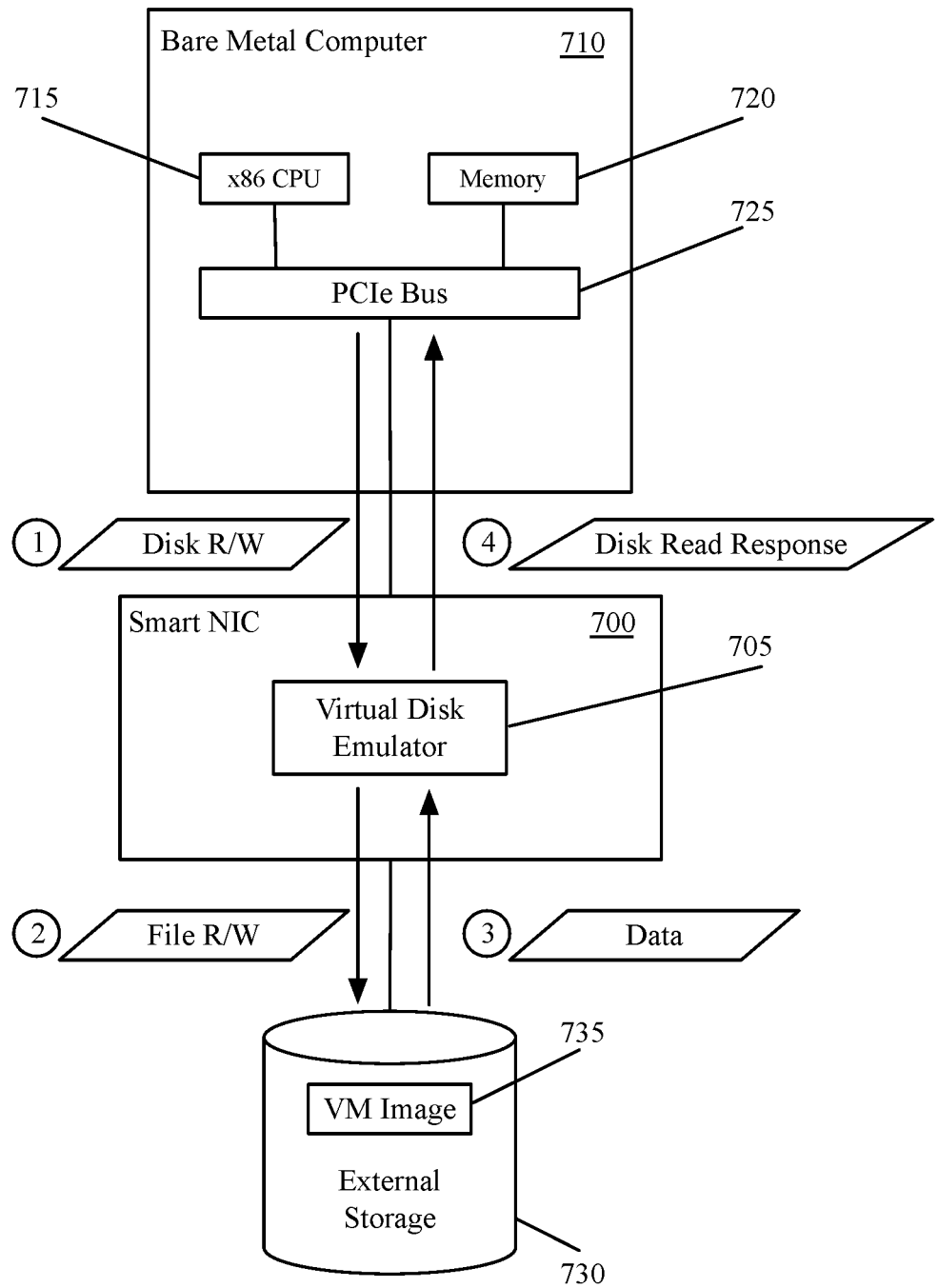
FIG. 7 conceptually illustrates the virtual disk emulator executing in a smart NIC performing translation for a disk read or write operation from a bare metal computer.

FIG. 7 conceptually illustrates the virtual disk emulator 705 executing in a smart NIC 700 performing such a translation for a disk read or write operation from a bare metal computer 710. As shown, the bare metal computer 710 includes an x86 CPU 715, memory 720, and a PCIe bus 725, which are described above by reference to FIG. 1. The smart NIC 700 includes a virtual disk emulator 705, which is described above by reference to FIG. 3.

As indicated by the encircled 1, the computer system 710 issues a disk read or write operation (e.g., an NVMe over PCIe operation) to a physical function of the smart NIC that connects to the PCIe bus to emulate an NVMe device. The virtual disk emulator 705 (possibly combined with other software layers executed by the NIC OS) translates this into a file read or write operation and sends this operation (e.g., via NVMeOF) to the external storage 730 that stores the VM image 735 used to boot the bare metal computer system 710 (i.e., that stores the operating system running on the bare metal computer system 710), as shown by the encircled 2.

This external storage 730, which may represent a distributed storage, a storage array, the storage associated with a compute manager, etc.) provides the requested data (for a read operation), as shown by the encircled 3, or stores the requested data (for a write operation), again via NVMeOF.

For read operations, the virtual disk emulator 705 (and any other necessary software layers, depending on the nature of the external storage 730) translates the data into a response to the disk read operation. This response with the requested data is provided to the bare metal computer system 710 (e.g., to the CPU 715) via the PCIe bus 725.

Because the smart NIC enables a bare metal computer system to use an externally-stored virtual disk as though it is a locally-attached disk and to boot from this virtual disk, in some embodiments a datacenter user (e.g., a network admin, app developer, etc.) can configure a VM, save the VM configuration, and then deploy this configuration on a bare metal computer (or multiple bare metal computers) in addition to deploying the configuration on additional VMs.

Figure 8:
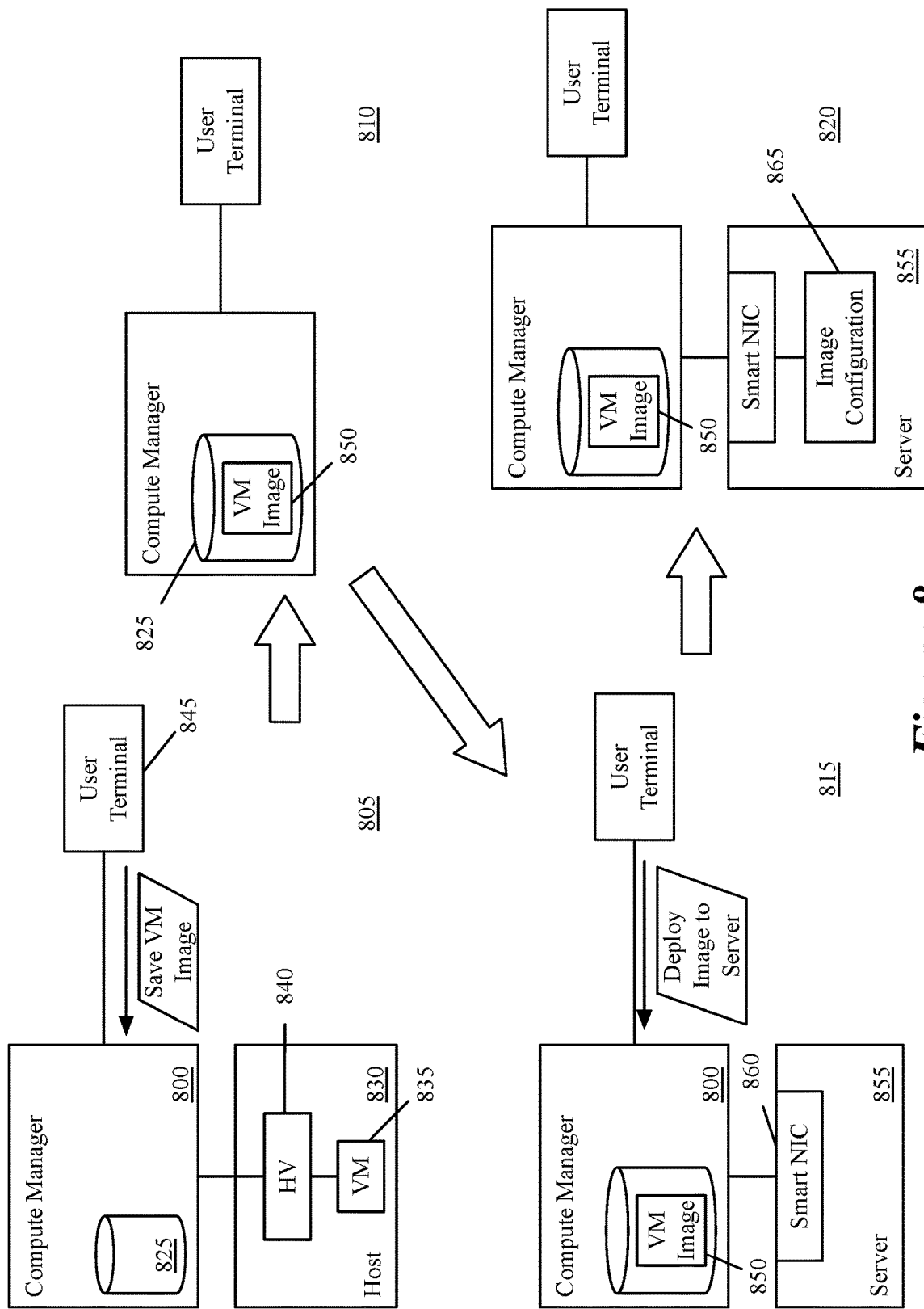
FIG. 8 conceptually illustrates the operations to deploy a VM image on a bare metal computer.

FIG. 8 conceptually illustrates the operations to deploy a VM image on a bare metal computer over four stages 805-820. As shown in the first stage 805, a compute manager 800 includes storage 825 (at this stage not shown to include any data). The compute manager 800 manages a host computer 830 on which a VM 835 executes on top of a hypervisor 840. This VM 835 has previously been configured by a user in some embodiments (e.g., through the compute manager 800, or by logging directly into the VM). The configuration includes loading a desired operating system on the VM, configuring the operating system, loading a desired set of applications, etc. With the VM 835 powered down, the user (via user terminal 845) commands the compute manager 800 to save an image of the VM.

The second stage 810 illustrates that a VM image 850 is stored in the compute manager storage 825, after the compute manager commands the host 830 (e.g., the hypervisor 840) to save an image of the VM 835. This VM image is a VMDK file in some embodiments, that stores the operating system, applications, and configuration for the VM 835, and which can be used to deploy additional VMs in the network. It should be noted that while this example shows the VM 835 as a VM in the network that is managed by the compute manager, and thus saved via the compute manager 800, in other embodiments the admin or other user could configure a VM and save a VM image offline or by directly logging into the VM 835 on the host 830.

The third stage 815 illustrates that the user (via the user terminal 845 commands the compute manager 800 to deploy the VM image to a physical server in the network. As shown at this stage, the compute manager 800 manages at least one physical (bare metal) server 855 with a smart NIC 860, in addition to the host computers in the network. Based on this command, the compute manager issues commands to the server 855 (via the smart NIC) to (i) use the stored VM image 850 as its boot disk (and primary disk for running applications, saving files, etc.). As described below, in some embodiments the compute manager uses a first set of APIs to communicate with the hardware of the server 855 (e.g., the same APIs used to communicate with VMs in the network), and the smart NIC translates these APIs into the native hardware APIs required by the physical server hardware. The fourth stage 820 illustrates that the server 855 is now up and running with the operating system and configuration 865 specified by the VM image 850, the VM configuration having been seamlessly deployed to a physical server.

As mentioned, the smart NIC also enables unified management of the VMs and bare metal computers in the network by enabling a compute manager that manages the machines in the network to use the same set of APIs for configuration and control of the VMs and bare metal computers. Typically, different APIs are used to communicate with VMs than are used to communicate with the bare metal hardware for operations such as powering on/off and configuring the machines and for providing remote console input (e.g., keyboard/mouse/touch input). The use of a smart NIC, at least at the bare metal computers, allows for the compute manager to use a uniform set of APIs, with the smart NIC translating API requests in a first format from the compute manager into API requests in a second format native to the bare metal computer.

Figure 9:
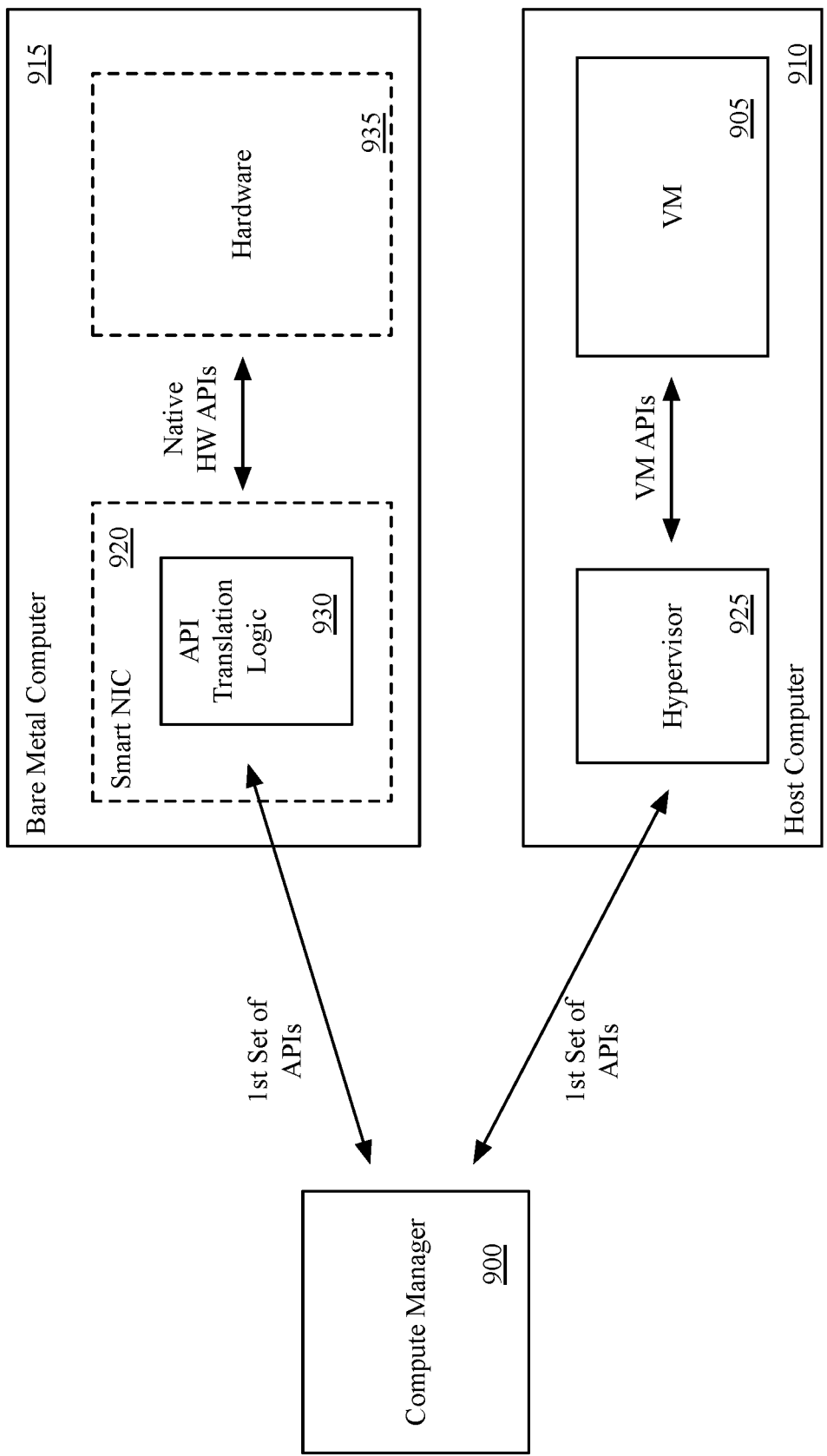
FIG. 9 conceptually illustrates a compute manager communicating with (i) a virtual machine on a host computer and (ii) the hardware of a bare metal computer using the same set of APIs.

FIG. 9 conceptually illustrates a compute manager 900 communicating with (i) a virtual machine 905 on a host computer 910 and (ii) the hardware of a bare metal computer 915 using the same set of APIs. As shown, the compute manager communicates with the smart NIC 920 of the bare metal computer 915 using a first set of APIs, which are also used to communicate with a hypervisor 925 of the host computer 910. The smart NIC 920 includes API translation logic 930 (i.e., as part of the smart NIC operating system) that translates these APIs into native hardware APIs in order to communicate with the hardware 935 of the bare metal computer 915. This hardware could be the x86 CPU, baseboard management controller, or other physical hardware of the computer. For instance, different types of APIs communicate with different hardware in some embodiments. Similarly, at the host computer 910, the hypervisor 925 translates between this first set of APIs and specific VM APIs in order for the compute manager 900 to communicate with and control the VM 905.

As an example, the compute manager 900 might use virtualized infrastructure manager (VIM) to communicate with hypervisors in a typical virtualized infrastructure. The translation logic 930 executing in the smart NIC 920 translates VIM API requests from the compute manager into the physical hardware APIs used by the bare metal computer. For instance, physical computers typically use intelligent platform management interface (IPMI) or Redfish for remote configuration, retrieval of physical resource statistics, etc., and the translation logical 930 of some embodiments translates VIM requests from VIM into IPMI or Redfish requests. Upon receiving a response, the translation logic 930 also translates the IPMI/Redfish responses into VIM responses. At the host computer 910, the hypervisor 925 also translates the VIM requests into a VM-specific API such as virtual machine communication interface (VMCI), enabling configuration, powering on and off of the VM, etc.

Similarly, the compute manager 900 might enable remote console sessions with the bare metal computer system, similar to a virtual machine. Here, an admin or other user can access and provide input to either the bare metal computer 915 or the VM 905 through the compute manager 900. The compute manager 900 uses the same set of remote console APIs, such as WebMKS, to communicate with the bare metal computer 915 and the VM 905. At the smart NIC 920, API translation logic 930 translates these uniform remote console APIs (e.g., WebMKS commands) into physical hardware APIs (e.g., virtual network computing (VNC)). This allows the remote user to provide input to the bare metal computer system 915 via the compute manager 900. Similarly, the hypervisor 925 at the host computer 910 translates commands in the uniform API into platform-specific commands for the VM, such as virtual KVM commands.

Through these techniques enabled by the smart NIC of some embodiments, the compute manager of some embodiments (e.g., VMware's vCenter) can manage a network with both hosted VMs and bare metal physical computers while treating each of these types of machines in the same manner.

That is, the UI tools, management stacks, etc. for managing VMs can be applied equally to both VMs and bare metal physical computers. These tools include tools for managing and deploying VM images that can now be applied to deploying these images on bare metal physical computers, as well as tools for configuring, viewing, and accessing machines in the network.

Figure 10:
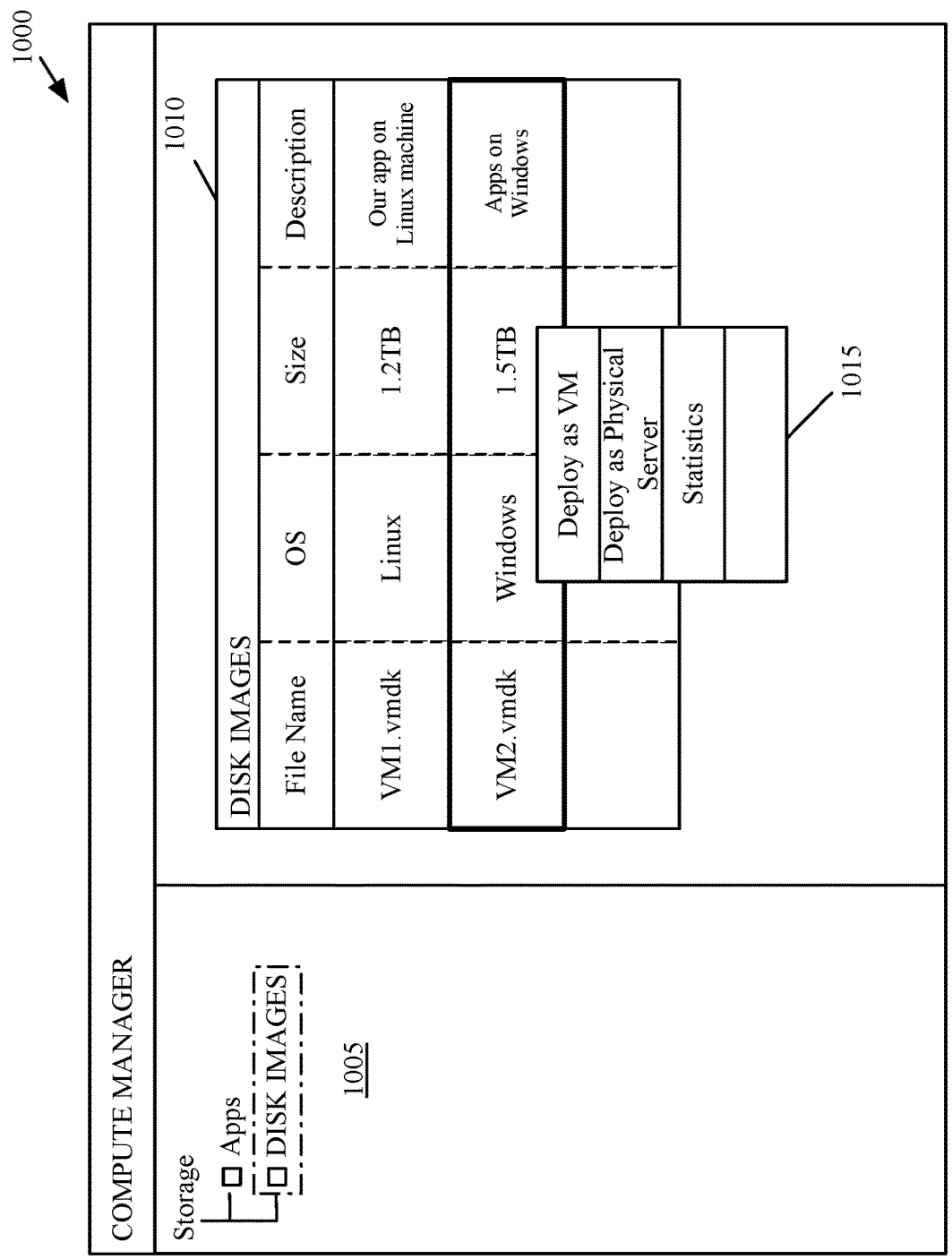
FIG. 10 illustrates a compute manager user interface of some embodiments that allows a user (e.g., a network administrator) to deploy a VM disk image as either a VM or a physical server.

FIG. 10 illustrates a compute manager user interface 1000 of some embodiments that allows a user (e.g., a network administrator) to deploy a VM disk image as either a VM or a physical server. As shown, the compute manager UI 1000 displays a storage display area 1005 showing various stored files associated with the compute manager, including a folder for applications and a folder for disk images, the latter of which is currently selected. In the main display area 1010, information about stored VM disk images is displayed by the compute manager. In this example, this information includes the file name of the VM image, the operating system of the VM image (i.e., the operating system that will be run by a VM or bare metal computer system deployed based on the VM image), the size of the VM image file, and a description.

The first VM disk image listed (VM1.vmdk) is an image of a Linux VM with a size of 1.2 TB, while the second VM disk image listed (VM2.vmdk) is an image of a Windows VM with a size of 1.5 TB. In this figure, the compute manager user has selected the second VM disk image in order to bring up a list of selectable options 1015 relating to the selected VM disk image. Specifically, in addition to the option to view statistics about the selected VM disk image, the user can opt to deploy the VM disk image either as a VM (as is common) or as a physical (bare metal) server, enabled by the smart NICs in the physical servers managed by the compute manager. In addition, some embodiments allow the user to select a VM disk image and deploy the image as numerous physical servers and/or numerous VMs at once (e.g., with each deployed VM or server using a different copy of the VM disk image).

Figure 11:
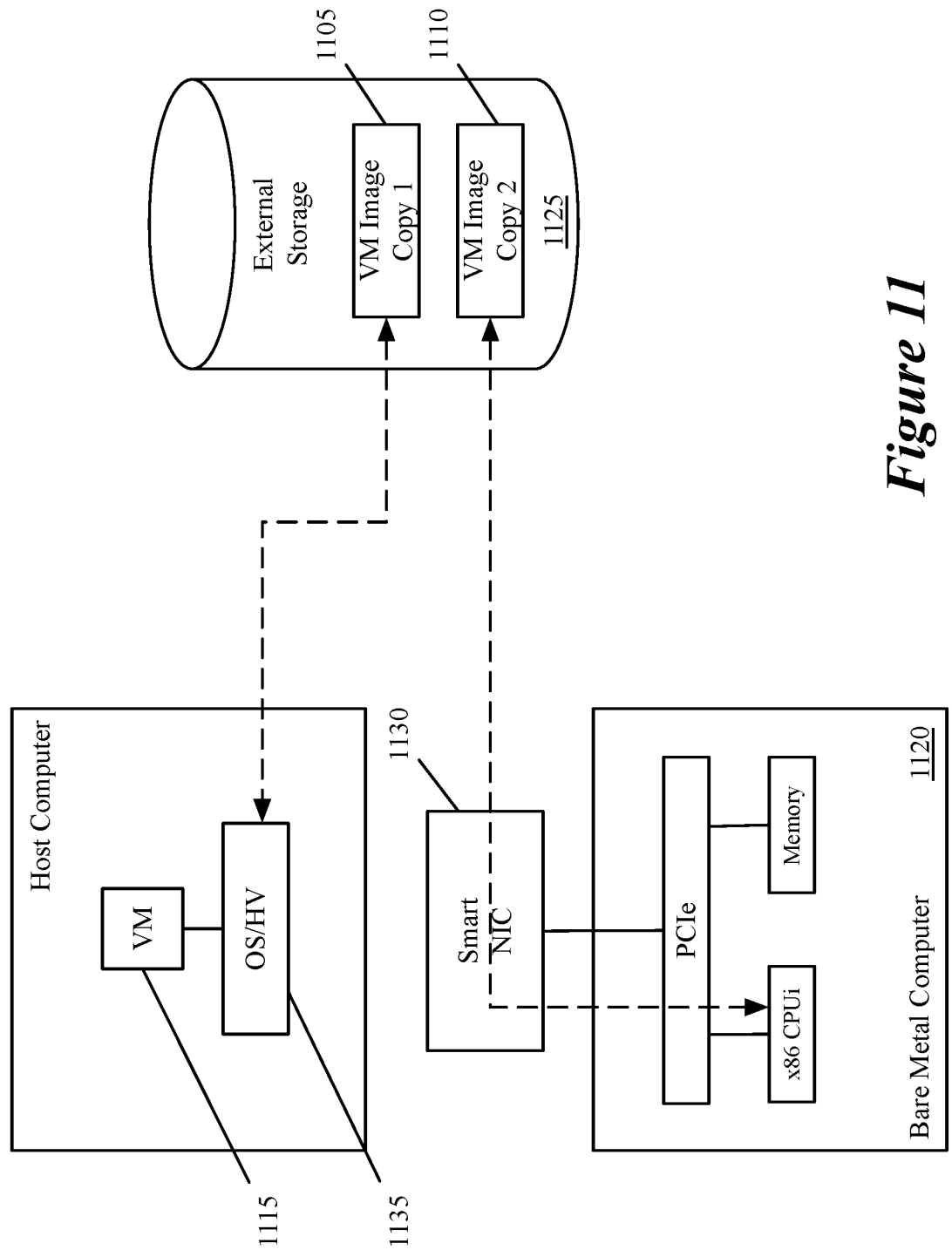
FIG. 11 conceptually illustrates two copies of the same VM image being used to deploy both a VM and a bare metal computer according to some embodiments.

FIG. 11 conceptually illustrates two copies 1105 and 1110 of the same VM image being used to deploy both a VM 1115 and a bare metal computer 1120 according to some embodiments. As shown, an external storage 1125 stores two copies 1105 and 1110 of the same VM image. These VM images are initially exact copies, though as the two machines 1115 and 1120 operate, the images might diverge as different files are saved, applications executed, etc. on the two different machines.

In the manner described above, the bare metal computer system 1120 accesses the second copy of the VM image 1110 in external storage, via the smart NIC 1130. The bare metal computer 1120 boots from this VM image file 1110 in addition to using the image file as its primary disk, with the smart NIC 1130 emulating a locally-attached disk and streaming data to and from the VM image file 1110. Similarly, the VM 1115 also boots from the VM image file 1105 in addition to using the image file as its primary disk, with the hypervisor 1135 emulating a locally-attached disk and streaming data to and from the VM image file 1105.

It should be noted that the above discussion relates to the case in which the physical infrastructure (i.e., the hardware) and the operating systems of the bare metal computers are managed by the same entity. In some embodiments, different entities manage the smart NIC and the operating system (e.g., a cloud provider manages the smart NIC hardware while a cloud customer is granted access over the x86 operating system, or the enterprise IT team manages the hardware while a particular application group or business line within the enterprise manages the x86 operating system). In these cases (or, for that matter, when the hardware and operating system are both managed by the same entity), the smart NIC can make a virtual disk (not necessarily a VM image file, but any virtual disk for storage) available as an NVMe device over the PCIe bus of the bare metal computer, while also acting as a network gatekeeper.

To enable this, in some embodiments, the smart NIC OS is instructed via an API call to make a particular (e.g., already existing) virtual disk visible to the x86 operating system (which boots from the local non-volatile storage, rather than a remote virtual machine image in this case). The smart NIC OS then mounts the virtual disk (e.g., using a remote VSAN client, network file system (NFS), or another protocol), and exposes this mounted virtual disk as an NVMe disk on the PCIe bus, thereby allowing the operating system operating on the x86 host to use the virtual disk as though it was a local non-volatile storage.

Figure 12:
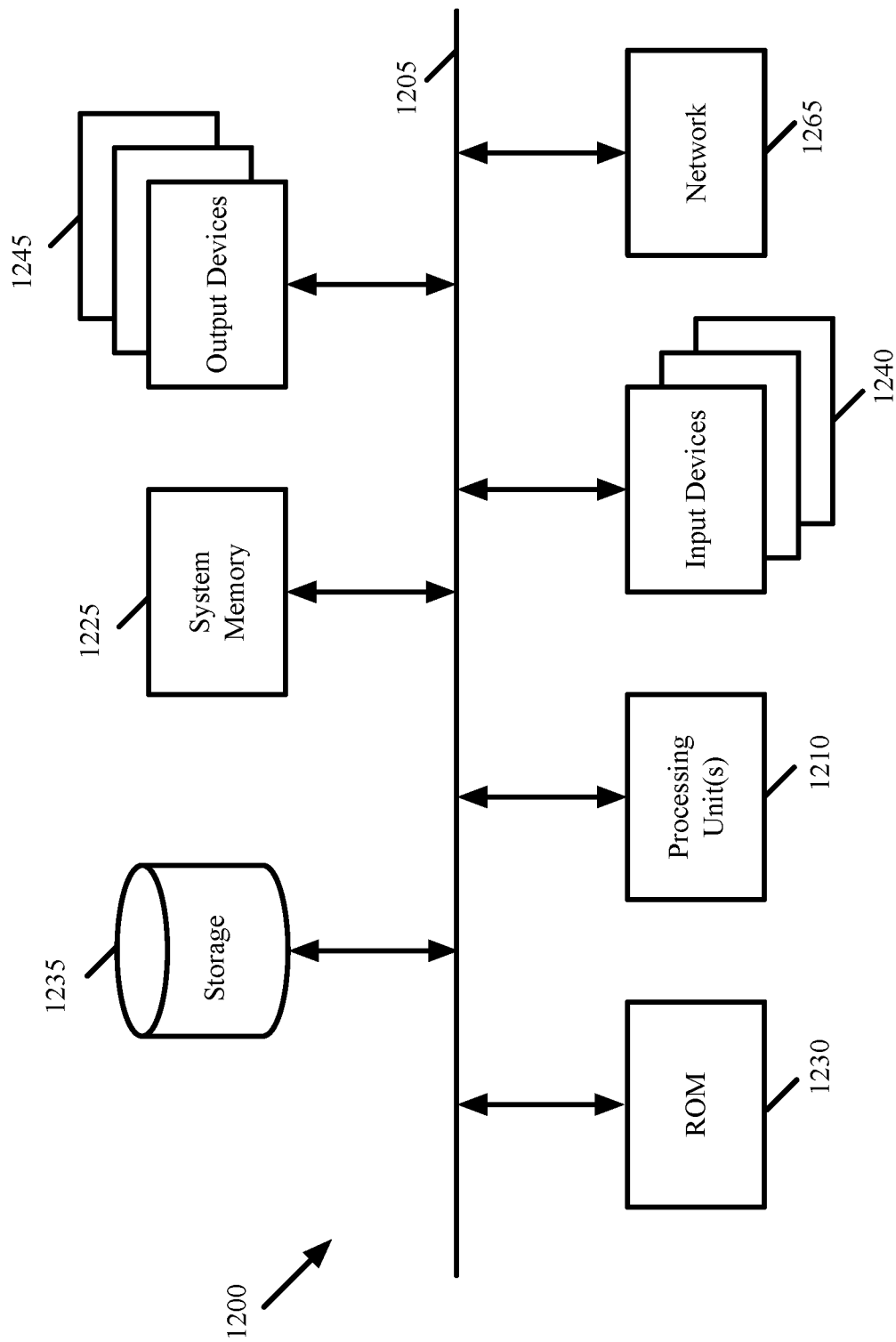
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4-6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for operating a physical server in a network, the method comprising:

storing a plurality of copies of one virtual machine (VM) image at a network-accessible storage;

storing, on a f first physical computing device that executes a hypervisor, a first copy of the VM image that is used to boot-up a first VM to execute on the hypervisor of the first physical computing device; and using a smart network interface controller (NIC) of a second physical computing device to retrieve a second copy of the same VM image from the network-accessible storage in order to boot-up a second VM on the second physical computing device, wherein to boot-up the second VM on the second physical computing device, the smart NIC converts read requests that the smart NIC receives from the second physical computing device in a first format to read requests in a second format that the smart NIC forwards to the network-accessible storage in order to retrieve data regarding the second copy of the VM image.

2. The method of claim 1, wherein the VM image is stored in a VM-specific format.

3. The method of claim 1, wherein the smart NIC communicates with the second physical computing device via a peripheral component interface express (PCIE) interface that executes on the smart NIC, the PCIE interface enabling the smart NIC to appear to the second physical computing device as a non-volatile memory express (NVMe) device.

4. The method of claim 1, wherein the smart NIC communicates with the network-accessible storage using NVMe over Fabrics (NVMeOF) protocol.

5. The method of claim 1, wherein the VM image is a virtual machine disk (VMDK) file.

6. The method of claim 1, wherein the smart NIC receives a command from a boot loader executing on the second computing device and streams data from the second copy of the same VM image in order to execute the VM to provide an operating system for the second computing device.

7. The method of claim 1, wherein the network-accessible storage is a distributed storage.

8. The method of claim 1, wherein the network-accessible storage is a storage associated with a compute manager for the network.

9. The method of claim 8, wherein the compute manager manages the first and second VMs and the second physical computing device.

10. The method of claim 1, wherein the network comprises a datacenter.

11. The method of claim 1, wherein the network comprises a plurality of datacenters.

12. The method of claim 1, wherein the smart NIC comprises an application specific integrated circuit (ASIC), a general purpose central processing unit (CPU), and a memory.

13. The method of claim 12, wherein the CPU executes a PCIE interface that presents the smart NIC as a plurality of separate devices, the plurality of separate devices comprising at least one NIC and at least one NVMe storage device.

14. The method of claim 12, wherein the ASIC is for processing data messages forwarded to and from the second physical computing device.

15. The method of claim 1, wherein the smart NIC executes a network virtualization program for providing network virtualization services.

16. The method of claim 15, wherein the network virtualization services comprise segregating data messages into different private networks that are defined over a datacenter's shared network and forwarding the data messages for the private networks.

17. The method of claim 15, wherein the network virtualization services comprise at least one of network switching operations and network routing operations.

18. The method of claim 15, wherein the network virtualization services comprise middlebox services.

19. A system comprising:
a network-accessible storage storing a plurality of copies of one virtual machine (VM) image;
a first physical computing device executing a hypervisor on which a f first VM runs by storing, on the first physical computing device, a first copy of the VM image that is used to boot-up the first VM; and
a second physical computing device comprising a smart network interface controller (NIC) used to retrieve a second copy of the same VM image from the network-accessible storage, wherein the second physical computing device boots-up a second VM by using the second copy of the same VM image, wherein to boot-up the second VM on the second physical computing device, the smart NIC converts read requests that the smart NIC receives from the second physical computing device in a first format to read requests in a second format that the smart NIC forwards to the network-accessible storage in order to retrieve data regarding the second copy of the VM image.

20. The system of claim 19, wherein the VM image is stored in a VM-specific format.

21. The system of claim 19, wherein the smart NIC communicates with the second physical computing device via a peripheral component interface express (PCIE) interface that executes on the smart NIC, the PCIE interface enabling the smart NIC to appear to the second physical computing device as a non-volatile memory express (NVMe) device.

22. The system of claim 19, wherein the smart NIC receives a command from a boot loader executing on the second physical computing device and streams data from the second copy of the same VM image in order to execute an operating system of the second physical computing device.

23. The system of claim 19, wherein:
the smart NIC comprises an application specific integrated circuit (ASIC), a general purpose central processing unit (CPU), and a memory;
the CPU executes a PCIE interface that presents the smart NIC as a plurality of separate devices, the plurality of separate devices comprising at least one NIC and at least one NVMe storage device;
the ASIC is for processing data messages forwarded to and from the second physical computing device; and
the smart NIC executes a network virtualization program for providing network virtualization services.

* * * * *